United States Patent [19]

Li et al.

[11] Patent Number: 5,100,847

[45] Date of Patent: Mar. 31, 1992

[54] SUPER TOUGH MONOLITHIC SILICON NITRIDE

[75] Inventors: Chien-Wei Li, Livingston; Jean Yamanis, Morristown; Gilbert Carrasquillo, Piscataway, all of N.J.

[73] Assignee: Allied-Signal Inc., Morris Township, Morris County, N.J.

[21] Appl. No.: 759,970

[22] Filed: Sep. 17, 1991

Related U.S. Application Data

[63] Continuation of Ser. No. 576,330, Aug. 31, 1990, abandoned, which is a continuation-in-part of Ser. No. 297,530, Jan. 17, 1989.

[51] Int. Cl.$^5$ ............................................. C04B 35/58
[52] U.S. Cl. ........................................ 501/97; 501/98
[58] Field of Search ................. 501/96, 97, 98; 264/65

[56] References Cited

U.S. PATENT DOCUMENTS

| | | | |
|---|---|---|---|
| 4,225,356 | 9/1980 | Prochazka et al. | 501/97 |
| 4,543,345 | 9/1985 | Wei . | |
| 4,609,633 | 9/1986 | Fukuhara et al. | 501/97 |
| 4,692,420 | 9/1987 | Oda et al. | 501/97 |
| 4,879,080 | 11/1989 | Hsieh | 501/97 |
| 4,904,624 | 2/1990 | Yeckley | 501/98 |
| 4,919,689 | 4/1990 | Pyzik et al. | 501/95 |

FOREIGN PATENT DOCUMENTS 0107914 8/1979 Japan ..................................... 501/97

OTHER PUBLICATIONS

Iskoe & Lange, "Development of Microstructure & Mechanical Properties . . . ", Cer. Microstructures '76 (ed. by Fulrath & Pask, Westview Press) 669-678 (1977).

F. F. Lange, "Fracture Toughness of $Si_3N_4$ as a Function of the . . . ", J. Am. Cer. Soc., vol. 62, 428-430 (1979).

F. F. Lange, "Fabrication and Properties of Dense Polyphase Silicon Nitride", Am. Ceram. Soc. Bull., vol. 62, 1369-1374 (1983).

Tani et al., "Gas-Pressure Sintering of $Si_3N_4$ with Concurrent Addition . . . ", American Ceram. Soc. Bull., vol. 65, 1311-1315 (1986).

Shalek et al., "Hot Pressed SiC Whisker/$Si_3N_4$ Matrix Composites", American Ceram. Soc. Bull., vol. 65, 351-356 (1986).

Salem & Shannon, "Fracture Toughness of $Si_3N_4$ Measured with short Bar . . . ", J. of Mat. Science, 22, 321-324 (1987).

Jenkins et al., "A 3-D Finite Element Analysis of a Chevron-Notched . . . ", Int. J. of Fract. 34, 281-295 (1987).

"Engineering Property Data on Selected Ceramics, vol. 1, Nitrides", Battelle Columbus Lab., Columbus, Ohio, p. 5.3.3-3 (1976).

G. Ziegler, "Effect of Phase Composition and Microstructure on the . . . ", J. Mat. Sci., 16, 495-503 (1981).

Primary Examiner—William R. Dixon, Jr.
Assistant Examiner—Paul Marcantoni
Attorney, Agent, or Firm—Ernest D. Buff; Gerhard H. Fuchs

[57] ABSTRACT

A monolithic silicon nitride ceramic is densified at temperatures lower than 2000° C. and heat treated at temperatures greater than 2000° C. in the presence of at least 6.5 w % of multi-component sintering aids. This monolithic silicon nitride has a highly acicular microstructure Chevron Notch fracture toughness greater than 9 MPa·m$^{\frac{1}{2}}$, R-curve behavior, high Weibull modulus, excellent damage tolerance, high thermal conductivity, and other desirable properties.

9 Claims, 11 Drawing Sheets

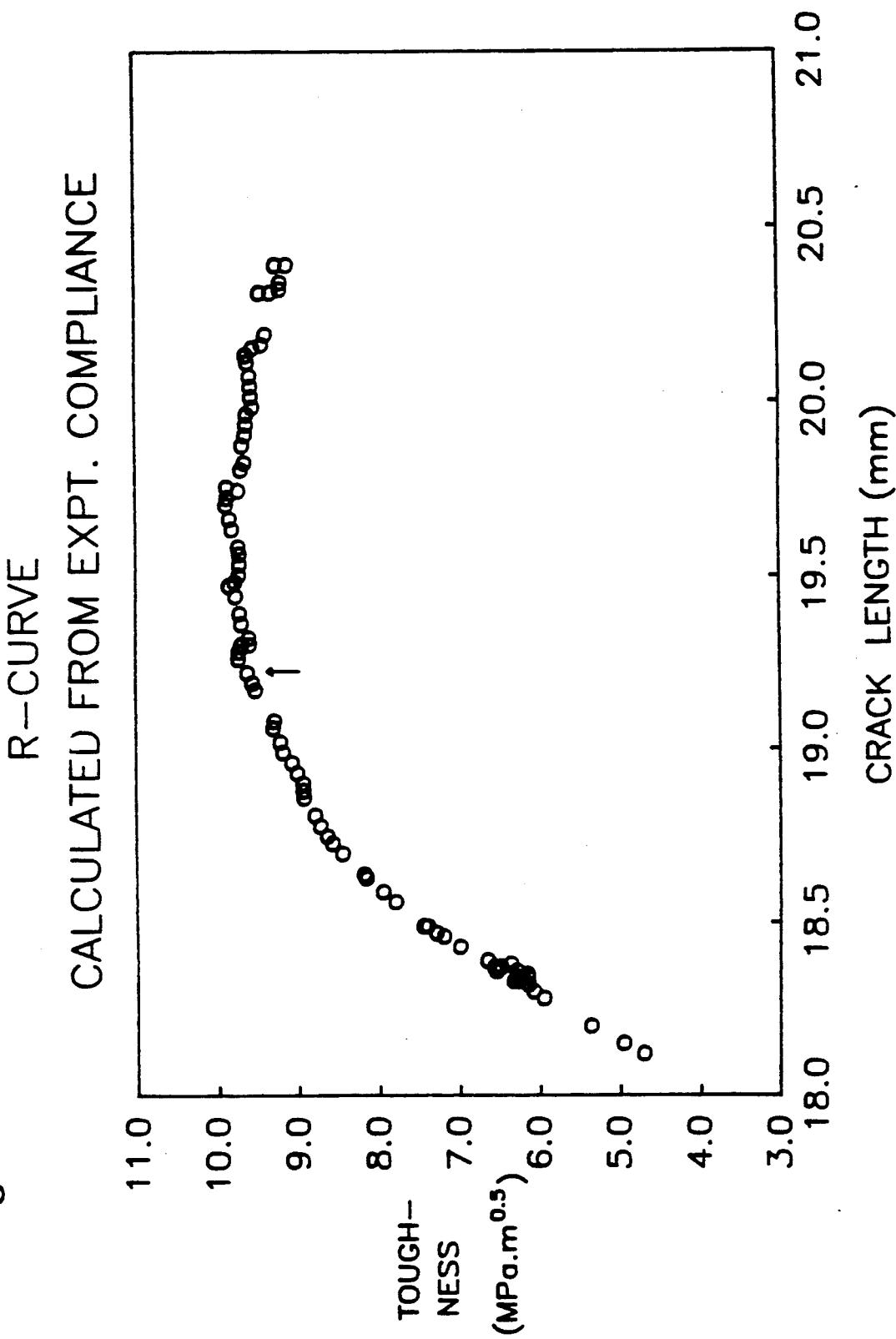

MEASUREMENT OF R—CURVE
DOUBLE CANTILEVER BEAM TECHNIQUE

Strain Energy Release Rate: $\quad G = \dfrac{P^2}{2B} \cdot \dfrac{dC}{da}$

Fracture Toughness: $\quad K = (E' G)^{1/2}$

SUPER TOUGH MONOLITHIC SILICON NITRIDE

CROSS REFERENCE TO RELATED APPLICATIONS

This application is a continuation of application Ser. No. 576,330 filed Aug. 31, 1990 abandoned, which in turn is a continuation-in-part of application Ser. No. 297,530, filed Jan. 17, 1989.

FIELD OF THE INVENTION

The present invention relates to the field of silicon nitride ceramics and more particularly to a monolithic silicon nitride ceramic having high fracture toughness and R-curve behavior.

DESCRIPTION OF THE PRIOR ART

Silicon nitride ceramics are conventionally densified under pressureless or pressure-assisted (i.e. hot-pressed or hot isostatically-pressed) conditions. Silicon nitride, a covalently bonded material is typically densified via liquid phase processes using a quantity of sintering aids. Liquid-phase sintered silicon nitride develops acicular, needle-like, grains via a reconstructive process. Alpha-$Si_3N_4$ particles in the raw material powder dissolve in the oxynitride liquid that forms at or below the densification temperature, silicon and nitrogen ions are transported through this liquid, and beta-$Si_3N_4$ precipitates out in the form of hexagonal prisms, i.e., acicular grains.

The fracture toughness of commercially available silicon nitride materials today is in the range of 4 to 7 MPa·m$^{\frac{1}{2}}$. Fracture toughness depends, to a certain degree, on the composition and volume fraction of the grain boundary phase and, to a greater degree, on the grain size, grain size distribution, and aspect ratio of the $Si_3N_4$ grains.

J. L. Iskoe and F. F. Lange in *Ceramic Microstructures '76* (edited by R. M. Fulrath and J. A. Pask, Westview Press, Boulder, Colo.), 669-678 (1977) disclose that the aspect ratio of $Si_3N_4$ grains is uniquely determined by the fractions of alpha-and beta-$Si_3N_4$ phases in the starting powder, the aspect ratio increasing with increasing alpha-phase content. Later F. F. Lange in *J. Am. Ceram. Soc.*, vol. 62, 428-430 (1979) and in *Am. Ceram. Soc. Bull.*, Vol. 62, 1369-1374 (1983) disclosed that the fracture toughness of silicon nitride, hot-pressed with 5% MgO at 1750° C. for 2 hours, increases with the alpha-phase content in the starting powder and, therefore, with aspect ratio. However, the toughness reaches a maximum of about 6 MPa·m$^{\frac{1}{2}}$ at a starting alpha-phase content of about 70%, with higher alpha-$Si_3N_4$ fractions having no further effect.

Tani et al. disclose in *Am. Ceram. Soc. Bull.*, Vol. 65, 1311-1315 (1986) experimental samples of silicon nitride with fracture toughness in the range of 6.7 to 9.0 MPa·m$^{\frac{1}{2}}$. In the preparation of these samples, Tani et al. used silicon nitride powder which contained 83% alpha-$Si_3N_4$. For those ceramics, Tani et al. disclose the use of (1) sintering aids composed of 0-5 w % $Al_2O_3$ with 5 w % of yttria ($Y_2O_3$), lanthana ($La_2O_3$), or ceria ($CeO_2$), (2) sintering temperature from 1700° C. to 2000° C., (3) a variety of thermal ramping and hold schedules, and (4) elevated nitrogen pressure. Despite the use of alumina as a sintering aid, which would lead to a liquid phase of relatively low viscosity, and so-called two-step sintering process the average fracture toughness for their preferred conditions (average of fracture toughness values given in Table I in the reference by Tani et al.) was 7.9 MPa·m$^{\frac{1}{2}}$.

In view of the apparent limitations to the fabrication of monolithic silicon nitride with high fracture toughness, attempts have been made to reinforce monolithic $Si_3N_4$ with SiC whiskers. For example, U.S. Pat. No. 4,543,345 teaches that significant improvements in the fracture toughness of various ceramics are obtained by the incorporation of SiC whiskers. However, most reports of silicon nitride reinforced with SiC whiskers claim fracture toughness in the 7 to 9 MPa·m$^{\frac{1}{2}}$ range. The best that has been achieved by SiC whisker reinforcement is represented by the data of Shalek et al. in *Am. Ceram. Soc. Bull.*, Vol 65, pp. 351-356 (1986). Shalek et al. used SiC whiskers fabricated by a vapor-liquid-solid (VLS) process and densified the SiC-$Si_3N_4$ composite using uniaxial hot pressing. The average fracture toughness of the composite was about 10 MPa·m$^{\frac{1}{2}}$, as measured by the Chevron Notch method, for whisker volume fractions of 10-30%.

Significant problems are presented in manufacture of whisker reinforced composites into useful ceramic components. These problems are encountered in batch formulation, where whiskers must be uniformly mixed throughout the matrix while maintaining size and shape; in green forming, where whisker orientation and de-mixing can occur; and in composite densification, where pressure assisted processes, such as uniaxial hot pressing and hot isostatic pressing, are required. Furthermore, such pressure assisted processes place severe restrictions on component size and shape, and on component cost. Such problems are avoided in fabrication of monolithic $Si_3N_4$ ceramics using gas pressure sintering. However, up until the present time, the fracture toughness obtained for monolithic $Si_3N_4$ ceramics has been relatively low.

When the resistance of a material to crack growth increases with crack extension, the material is said to exhibit R-curve behavior. J. A. Salem and J. L. Shannon, *J. of Mat. Sci.*, 22, pp. 321-324 (1987) and M. G. Jenkins et al., *Int. J. of Fract.*, 23, pp. 281-295 (1987) evaluated the crack growth resistance of monolithic silicon nitride ceramics with fracture toughness in the range of 4.7 to 7.0 MPa·m$^{\frac{1}{2}}$. They found that the resistance of these ceramics did not increase with crack extension and concluded that monolithic silicon nitride ceramics, with fracture toughness up to 7.0 MPa·m$^{\frac{1}{2}}$, do not exhibit R-curve behavior.

In addition to the low fracture toughness and the absence of R-curve behavior, monolithic silicon nitride ceramics processed by conventional procedures have had low Weibull modulus and low damage tolerance. For example, sintered silicon nitride billets obtained from powder compacts formed by cold isostatic pressing usually have Weibull modulus of about 10 and lose a large fraction of their strength upon surface damage by a Vickers indenter even at low loads. These ceramics also have low thermal conductivity with values ranging from about 25 to about 40 W.m$^{-1}$.K$^{-1}$ [see for example, "Engineering Property Data on Selected Ceramics, Vol. 1, Nitrides" Battelle Columbus Laboratories, Columbus, Ohio, p. 5.3.3-3 (1976) and G. Ziegler and D. P. H. Hasselman, *J. Mat. Sci.*, 16, pp. 495-503 (1981)].

Thus, up until the present time, monolithic silicon nitride ceramics have had relatively low fracture toughness, low Weibull modulus and low thermal conductivity; and none of these monolithic $Si_3N_4$ ceramics has ever been shown to have R-curve behavior or damage tolerance.

SUMMARY OF THE INVENTION

Present invention provides a silicon nitride ceramic which is economical to manufacture and has high fracture toughness. The Chevron Notch fracture toughness of the ceramic is greater than 9 MPa·m$^{\frac{1}{2}}$, preferably at least about 9.5 MPa·m$^{\frac{1}{2}}$, and more preferable ranges from about 10 to 18 MPa·m$^{\frac{1}{2}}$. In addition, the ceramic exhibits R-curve behavior making it more tolerant to flaws induced during manufacture or service. Ceramics provided by this invention have a 4-point bend strength Weibull modulus of at least 15 and a damage tolerance characterized by the equation B=d (log S)/d(log P), where S is the 4-point bend strength measured after indentation, P is the Vickers indentation load and B is greater than −0.3. Furthermore, the thermal conductivity of the monolithic silicon nitride ceramics of the present invention is higher than 40 W.m$^{-1}$.K$^{-1}$ and oftentimes as high as 80 W.m$^{-1}$.K$^{-1}$.

The invention further provides a process for making a monolithic silicon nitride of unusually high fracture toughness wherein the ceramic is densified and heat treated in the presence of an adequate quantity of selected sintering aids which are stable throughout the densification and heat treatment. It has been found that by carrying out the densification in at least two steps wherein at least one step is carried out at temperatures between 1750° C. and 2000° C. and for a time between 1 and 10 hrs. in order to prepare an intermediate ceramic with a density of at least 90% of theoretical, and by heat treating the intermediate ceramic in one or more subsequent steps of which steps at least one step is carried out at temperatures higher than 2000° C. and for a time between 1 and 10 hrs.

while the nitrogen pressure is maintained at sufficiently high level in every step in order to avoid decomposition of Si$_3$N$_4$, a silicon nitride ceramic is produced which has a density greater than 95% of theoretical density, a Chevron Notch fracture toughness of at least 9.0 MPa·m$^{\frac{1}{2}}$ at room temperature, R-curve behavior, and other highly improved properties as mentioned earlier.

The invention further provides a ceramic which is densified and heat treated in the presence of refractory sintering aids the major component of which is an oxide, nitride or oxynitride compound of two or more of the elements Y, La, Ce, Pr, Nd, Sm, Gd, Tb, Dy, Ho, Er and Yb and the minor component of which is an oxide or oxynitride compound of one or more of the elements Mg, Sr, Ba, Al or Si.

It has unexpectedly been found that in order to make a monolithic silicon nitride ceramic with fracture toughness greater than or equal to 9 MPa·m$^{\frac{1}{2}}$, the said sintering aids should be present in an amount of at least 6.5 w %, and preferably in an amount of at least 8.0 w %. Excessive amounts of sintering aids degrade the high temperature mechanical, creep and oxidation properties of silicon nitride ceramics and the preferred range of said sintering aids is in an amount ranging from about 6.5 to about 18 w %. In addition, for good high temperature properties the said major sintering aid component should be present in an amount of at least 5 w % and the said minor sintering aid component should be present in an amount less than 4 w %.

In this manner there is provided monolithic silicon nitride ceramics which have a highly acicular microstructure and a high density of large grains, and which further exhibit high fracture toughness (e.g., Chevron Notch fracture toughness ranging from 9 to 18 MPa·m$^{\frac{1}{2}}$), R-Curve behavior (e.g., B constant greater than −0.3, as discussed hereinafter in greater detail) high tolerance to damage (e.g., samples with defects remain strong and often retain as much as 60% of strength after 196 newtons (N) Vickers indentation on the tensile surface of a sample under bending stress), high Weibull modulus (e.g., greater than 12 and often as high as 20 or more), and superior thermal conductivity (e.g., greater than 45 W°m$^{-1}$°K$^{-1}$ and often as high as 80 W°m$^{-1}$°K$^{-1}$).

Advantageously, problems associated with forming and densification of whisker reinforced composites are substantially eliminated. The monolithic silicon nitride based ceramic is readily manufactured in diverse sizes and shapes which are tough, durable, and reliable in operation. As a result, the ceramics of the present invention are especially suited for use in load bearing applications such as static or moving turbomachinery components having a broad operating temperature range, pump and valve components, internal combustion engine parts, cutting tools, and the like. Further, the ceramics of the invention are suitable for use as matrices for ceramic composite materials.

BRIEF DESCRIPTION OF THE DRAWINGS

The invention will be more fully understood and further advantages will become apparent when reference is made to the following detailed description and the accompanying drawings, in which:

FIG. 4 is a graph in which toughness is measured as a function of crack length, the graph showing R-curve behavior for a different silicon nitride billet, the billet having been densified and heat treated under the condition for the ceramics of FIGS. 3(a) and 3(b);

DETAILED DESCRIPTION OF THE INVENTION

Figure 1A:
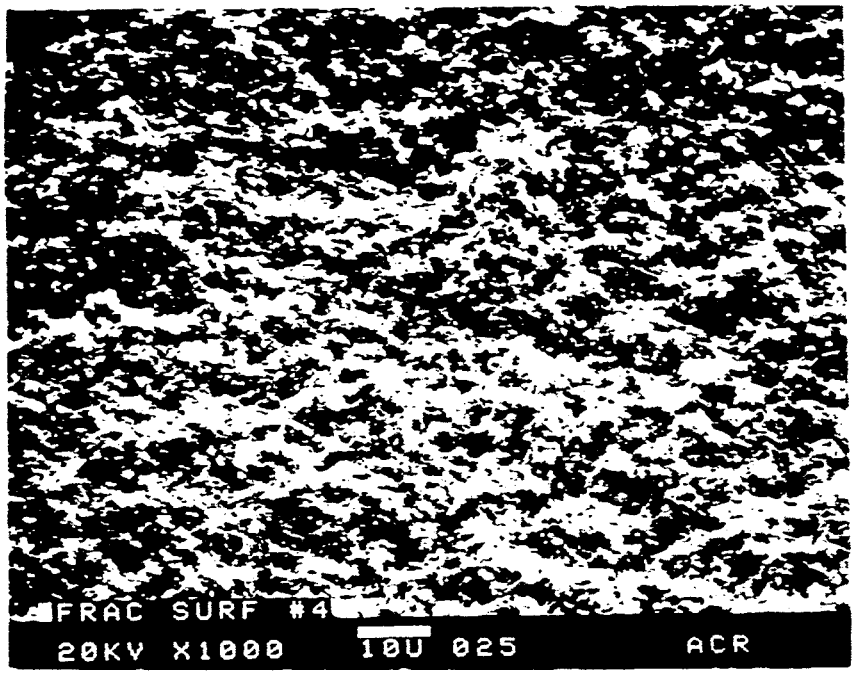
FIG. 1(a) is a scanning electron micrograph of a fracture surface of a silicon nitride based ceramic densified at a temperature of 1765° C. for 2 hours.

In the manufacture of silicon nitride ceramics, a silicon nitride powder typically having an average particle size less than 2 micrometers and alpha silicon nitride content of about 90 is mixed with sintering aid.

The sintering aid should be a mixture the major component of which is an oxide, nitride or oxynitride compound of two or more of the elements Y, La, Ce, Pr, Nd, Sm, Gd, Tb, Dy, Ho, Er, and Yb and the minor component of which is an oxide or oxynitride compound of one or more of the elements Mg, Sr, Ba, Al or Si. The specific composition of the sintering aid is chosen so as:

(a) to permit densification of the silicon nitride powder to a useful ceramic at the desired densification temperature;

(b) to lead to a strong and tough ceramic over a broad temperature range; and (c) to yield a ceramic with adequate oxidation and thermal shock resistance.

It has unexpectedly been found that in order to make a monolithic silicon nitride ceramic with fracture toughness greater than or equal to 9 MPa·m$^{\frac{1}{2}}$, the said sintering aids should be present in an amount of at least 6.5 w %, and preferably in an amount of at least 8.0 w %. However, excessive amounts of sintering aids degrade the high temperature mechanical, creep and oxidation properties of silicon nitride ceramics and the preferred range of said sintering aids is in an amount ranging from about 6.5 to about 18 w %. In addition, for good high temperature properties the said major sintering aid component should be present in an amount of at least 5 w % and the said minor sintering aid component should be present in an amount less than 4 w %.

The mixture of silicon nitride and sintering aid is formed into the desired shape by slip casting, cold isostatic pressing, die forming, or other conventional ceramic manufacturing techniques. The green ceramic part thus formed is then densified, typically by firing in an electrically heated furnace in a nitrogen containing atmosphere.

An important feature of the present invention is that low cost conventional ceramic processing techniques can be used to form high toughness dense silicon nitride by using fine grain silicon nitride powders, judiciously selected sintering aids, as specified earlier, and sintering processes which promote the development of a highly acicular microstructure, which microstructure confers to the ceramic its high fracture toughness and other desirable properties. We have discovered that the sintering processes used are very important in the development of monolithic silicon nitride with unusually high fracture toughness. The sintering process may have two or more temperature steps. It may have one or more temperature ramping stages, the rates of which allow satisfactory heat transfer to occur. The sintering process should have densification and heat treatment steps where the densification steps include:

at least one step which is carried out at temperatures between 1750° and 2000° C. and for a time between 1 and 10 hrs. in order to prepare an intermediate ceramic with a density of at least 90% of theoretical, and where the intermediate ceramic is subjected to heat treatment in one or more subsequent steps of which steps:

at least one step is carried out at temperatures higher than 2000° C. and for a time between 1 and 10 hrs. while the nitrogen pressure is maintained at sufficiently high level in every step in order to avoid decomposition of $Si_3N_4$.

Processing of the silicon nitride ceramic which comprises the refractory sintering aids previously defined for the particular temperatures and times, especially the temperatures and times of the heat treatment steps set forth above is required for the development of the desirable microstructure, which yields high fracture toughness, R-curve behavior, high Weibull modulus and damage tolerance, including impact resistance, thermal shock resistance, creep resistance and long stress rupture life.

The following examples are presented to provide a more complete understanding of the invention. The specific technique, conditions, materials, proportions and reported data set forth to illustrate the principles and practice of the invention are exemplary and should not be construed as limiting the scope of the invention. Examples 1, 2-5, and 9-29 specify how to formulate the powder mixture of silicon nitride and sintering aids; how to form this powder mixture into compacts for subsequent sintering; and how to set the temperature, time and nitrogen pressure during densification in order to obtain unique silicon nitride ceramics within the scope of the present invention. These ceramics have novel microstructures with a high density of large grains and are characterized by the unusually high fracture toughness (as measured by chevron notch techniques) of 9.25 to 11.0 MPa·m$^{\frac{1}{2}}$. In addition to high fracture toughness these monolithic silicon nitride ceramics have a rising crack growth resistance with increasing crack length, i.e., R-curve behavior, high tolerance to damage, high Weibull modulus, and thermal conductivity.

Comparative Examples C1, and C2 to C10 shown in Tables C1 and C2, and Examples 6-8 shown in Tables 1 and 2 reflect conditions and properties of silicon nitride ceramics which lie outside the scope of the present invention. Example C11 shows data on the thermal conductivity of conventionally processed silicon nitride while Examples 30-31 show data on the thermal conductivity of silicon nitride formulated and processed within the scope of the present invention.

"Test 1. R-Curve Behavior", "Test 2. Indentation/Strength Behavior", and "Test 3. Weibull Modulus" set forth the methods to be used to test ceramics for the properties of R-curve behavior, damage tolerance, and Weibull modulus, respectively. These methods can be readily used to characterize the properties of ceramics

COMPARATIVE EXAMPLE C 1

1. Preparation of Samples $Si_3N_4$ powder with alpha $Si_3N_4$ content greater than 85% and having a BET surface area of 12 m$^2$/g, a metallic or cationic impurity level of less than 0.1% by weight of C, Cl, Fe, Al, Ca, or K, an oxygen content of 1.7–1.9% by weight and having average grain size of 0.6 micrometer was used. The nitride powder was mixed with 4% wt yttria ($Y_2O_3$) and 4 wt % $MgAl_2O_4$ sintering aid powders. Both sintering aid powders had a purity of 99.9% by weight and an average grain size less than 10 micrometer. The formulated mixture weighing 350 g, was wet-milled for at least 2.5 hours in a one liter polyethylene vessel using zirconia grinding media and 500 cc of isopropyl alcohol. The mixture was vacuum dried, dry milled for 2 hours in a polyethylene vessel using zirconia grinding media, and the resulting powder sieved through a 65 mesh nylon screen. This milled powder was then isostatically pressed at 30,000 psi into a 2 cm×2 cm×6 cm bar, which was subsequently fired at 1765° C. under one atmosphere of nitrogen gas for 2 hrs.

2. Characterization of the Sintered Billet

The density of the sintered body was measured by water immersion or geometrical methods and found to be in the range of 3.17–3.23 gcc (greater than 97% TD). The fracture toughness value was measured using a Chevron-Notched sample geometry and found to be 6.0 (±0.25) MPa·m$^{\frac{1}{2}}$.

FIG. 1(a) is a scanning electron microscopy photograph of a fracture surface of a ceramic prepared in this example. This photomicrograph shows that the microstructure of this material is comprised of very fine grains.

COMPARATIVE EXAMPLE 2-C10

1. Preparation of Green Samples

A raw material powder of $Si_3N_4$ with alpha $Si_3N_4$ greater than 85% and containing less than 100 PPM of metallic impurities such as Fe, Al, Ca, Na, or K and 1 wt % by weight of oxygen and having an average grain size of 0.6 micrometer and a specific surface area of 13 m$^2$/g was mixed with an additive as shown in Table C1. The additive had a purity of more than 99% by weight and an average grain size less than 10 micrometers. Thereafter, 200 to 300 g of the raw material thus formulated were wet milled in a 1.2 liter plastic bottle using zirconia grinding media and isopropanol (500 ml) for at least 6 hrs. The slurry was vacuum dried overnight and the milled powder was sieved through a 30-mesh sieve. The sieved powder was isostatically pressed at a pressure of 206 MPa to obtain billets of approximate dimension 2 cm by 2 cm by 6 cm.

2. Firing Process

Billets prepared as specified above were placed in a graphite crucible. The crucible was loaded into a two-zone carbon furnace having a hot zone 15 cm in diameter by 22 cm in height. The furnace was then evacuated and pressurized to 50 PSi with pure nitrogen gas. After three gas release-pressurize cycles, the furnace was operated at the heating schedules shown in Table C1.

3. Characterization of Sintered Billets

The densities of the sintered bodies were measured by water immersion of geometrical methods. The fracture toughness values were measured using either short bar Chevron-Notched or 3-pt bend Chevron-Notched sample geometry. The results are shown in Table C2.

TABLE C1

| Ex. | Comp. of Sint. Aid Addit. (w %) | Temp. (°C.) | Time (hr) | $N_2$ (psi) | + | Temp. (°C.) | Time (hr) | $N_2$ (psi) |
|---|---|---|---|---|---|---|---|---|
| C2 | 5.4$La_2O_3$—1.8$Y_2O_3$—0.8SrO | 1980 | 4 | 400 psi/2 h 900 psi/2 h | — | — | — | — |
| C3 | 5.4$La_2O_3$—1.8$Y_2O_3$—0.8SrO | 1980 | 8 | 350 psi | — | — | — | — |
| C4 | 6$La_2O_3$—2$Y_2O_3$—2SrO | 1950 | 4 | 250 psi | — | — | — | — |
| C5 | 4.9$La_2O_3$—2$Y_2O_3$—1.5SrO | 1960 | 8 | 350 psi/2 h 900 psi/2 h 1500 psi/4 h | — | — | — | — |
| C6 | 6$La_2O_3$—2$Y_2O_3$—1.5SrO | 1960 | 4 | 350 psi/2 h 900 psi/2 h | — | — | — | — |
| C7 | 6.75$La_2O_3$—2.25$Y_2O_3$—1$SiO_2$ | 1930 | 2 | 180 psi | + | 1980 | 3 | 350 |
| C8 | 6.75$La_2O_3$—2.25$Y_2O_3$—1$SiO_2$ | 1850 | 1 | 150 psi | + | 1950 | 2 | 300 |
| C9 | 5$Yb_2O_3$—5$DY_2O_3$—1$SiO_2$ | 1950 | 3 | 250 psi/1 h 1050 psi/2 h | — | — | — | — |
| C10 | 7.6$Er_2O_3$—4.5$Y_2O_3$—2.5$SiO_2$ | 2000 | 4 | 500 psi | — | — | — | — |

TABLE C2

| Example | Fracture Toughness (MPa · m$^{\frac{1}{2}}$) | Density (g/cm$^3$) |
|---|---|---|
| C2 | 8.4 | 3.31 |
| C3 | 9.0 | 3.25 |
| C4 | 7.75 | 3.32 |
| C5 | 8.12 | 3.31 |
| C6 | 8.75 | 3.3 |
| C7 | 9.0 | 3.33 |
| C8 | 8.3 | 3.31 |
| C9 | 8.55 | 3.43 |
| C10 | 8.7 | 3.3 |

EXAMPLE 1

1. Preparation of Samples

Cold isopressed bars of the same composition as that described in Comparative Example C1 were prepared by a similar procedure. These billets were fired at 1900° C. for 2 hours under 130 psi of $N_2$ and at 2050° C. for 3 hours and under 1200 psi of $N_2$.

2. Characterization of the Sintered Billet

The density of the sintered body was measured by water immersion or geometrical methods and found to be 3.23 gcc. The fracture toughness value was measured using a Chevron-Notched sample geometry and found to be 10.3 MPa·m$^{\frac{1}{2}}$.

The microstructure of the sintered sample was examined by scanning electron microscopy.

Figure 1B:
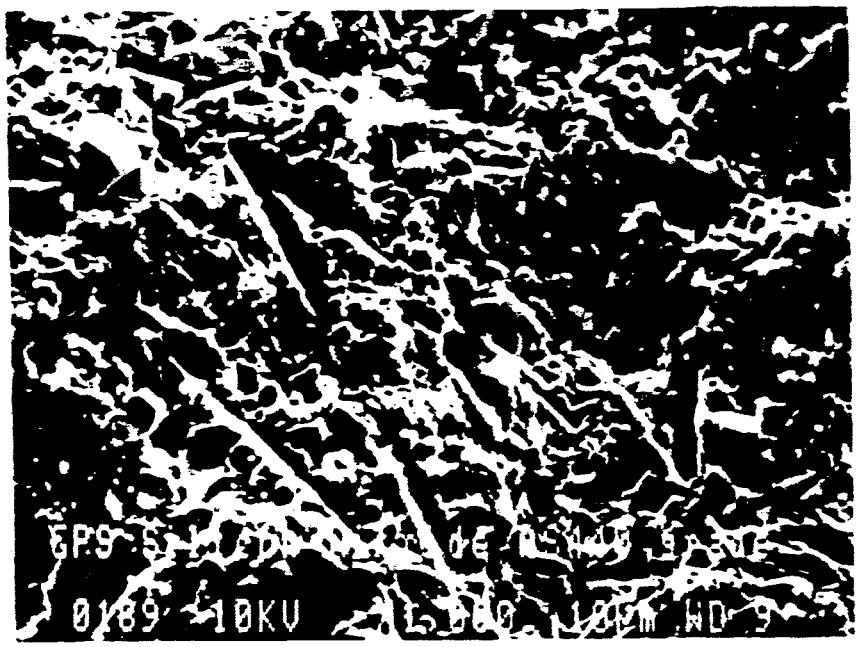
FIG. 1(b) is a scanning electron micrograph of a fracture surface of a silicon nitride based ceramic densified at a temperature of 1900° C. for 2 hours and heat treated at a temperature of 2050° C. for 3 hours.

FIG. 1(b) shows a fracture surface of this material. The microstructure is comprised of a wide distribution of small and large acicular grains which bring about the material's high toughness.

EXAMPLES 2-19

1. Preparation of Green Samples

A raw material Powder of $Si_3N_4$ containing less than 100 PPM of metallic impurities such as Fe, Al, Ca, Na, or K and 1.7% to 1.9% by weight of oxygen and having an average grain size of 0.6 micrometer and a specific surface area of 12.2 $m^2/g$ was mixed with an additive shown in Table 1. The additive had a purity of more than 99% by weight and an average grain size less than 10 micrometers. Thereafter, 200 to 300 g of the raw material thus formulated were wet milled in a 1.2 liter plastic bottle using zirconia grinding media and isopropanol (500 ml) for at least 6 hours. The slurry was vacuum dried overnight and the milled powder was sieved through a 30-mesh sieve. The sieved powder was isostatically pressed at a pressure of 206 MPa to obtain billets of approximate dimension 2 cm by 2 cm by 6 cm.

2. Firing Process

Billets prepared as specified above were placed in a graphite crucible. The crucible was loaded into a two-zone carbon furnace having a hot zone 15 cm in diameter by 22 cm in height. The furnace was then evacuated and pressurized to 50 PSi with pure nitrogen gas. After three gas release-pressurize cycles, the furnace was operated at the heating schedules shown in Table 1.

3. Characterization of Sintered Billets

The densities of the sintered bodies were measured by water immersion or geometrical methods. The fracture toughness values were measured using either short bar Chevron-Notched or 3-pt bend Chevron-Notched sample geometry. The results are shown in Table 2.

Figure 2:
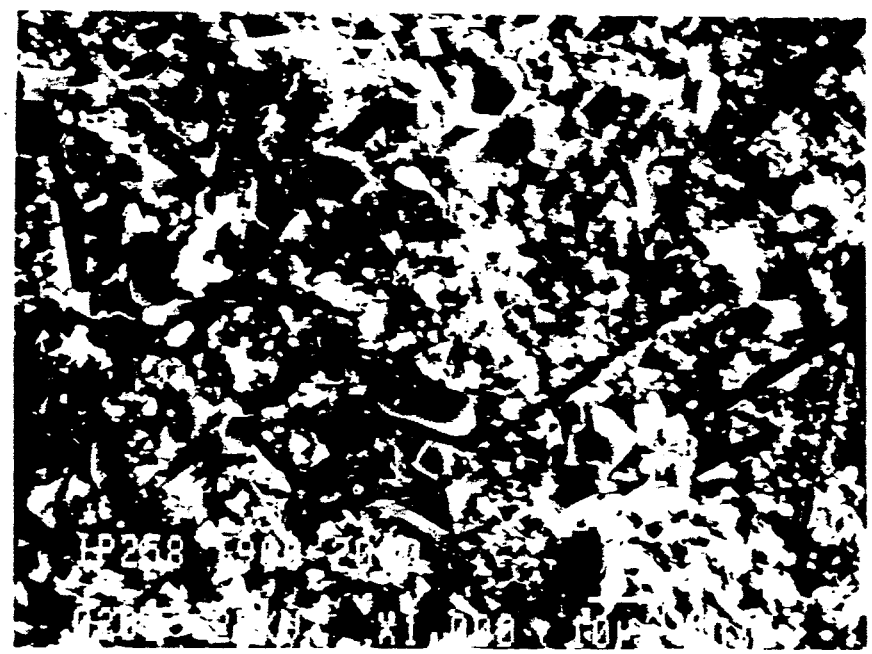
FIG. 2 is a scanning electron micrograph of a fracture surface of a silicon nitride based ceramic densified at a temperature of 1900° C. for 90 minutes and heat treated at a temperature of 2000° C. for 2 hrs.

The microstructure of the silicon nitride ceramic prepared in Example 2 is shown in FIG. 2, which is a photomicrograph of a fracture surface obtained by scanning electron microscopy (SEM).

Figure 3A:
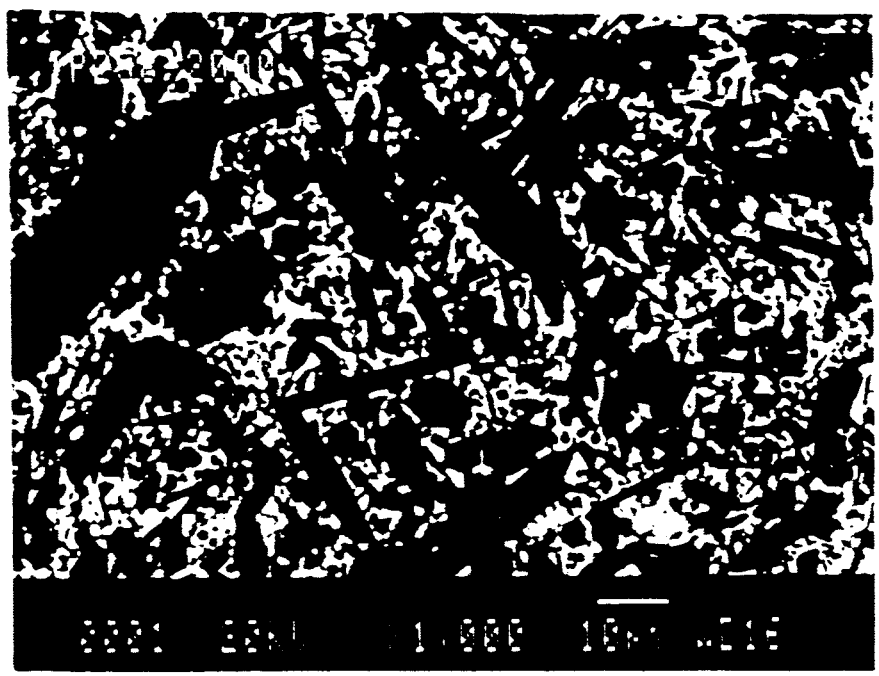
FIG. 3(a) is a scanning electron micrograph of a polished surface of a silicon nitride based ceramic densified at a temperature of 1900° C. for 2 hours and heat treated at a temperature of 2050° C. for 3 hours.
Figure 3B:
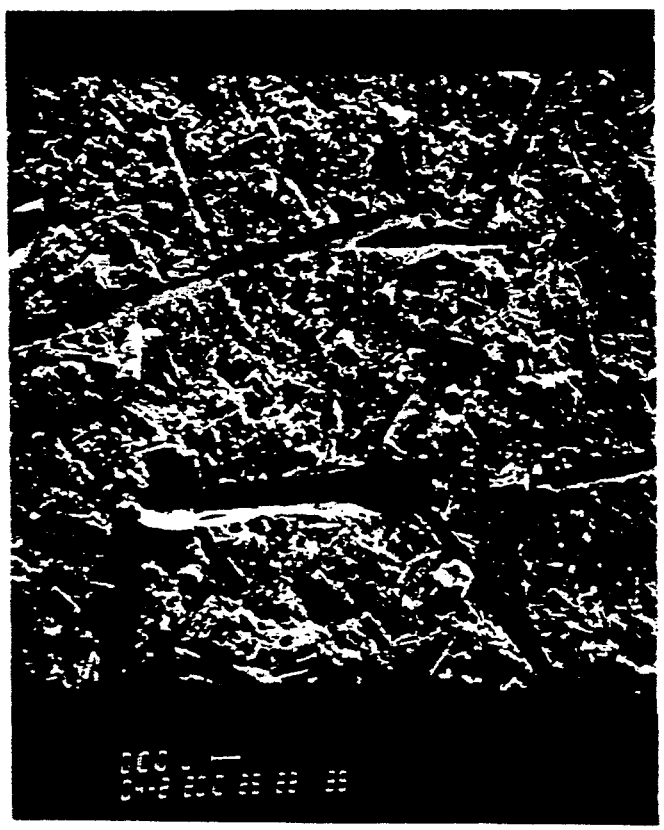
FIG. 3(b) is a scanning electron micrograph of a fracture surface of the silicon nitride based ceramic of FIG. 3(a)

The microstructure of the silicon nitride prepared according to Example 3 is shown in FIG. 3(a) and FIG. 3(b). FIG. 3(a) is a photomicrograph of a polished cross section of the ceramic. FIG. 3(b) is a photomicrograph of a fracture surface of the ceramic of Example 3. Both polished and fracture surface pictures indicate that this ceramic has a high density of large silicon nitride grains.

TABLE 2

| Example No. | Fracture Toughness (MPa · $m^{0.5}$) | Density (g/cm$^3$) |
| --- | --- | --- |
| 2 | 9.45 ± 0.36 | 3.32 |
| 3 | 10.64 ± 0.49 | 3.31 |
| 4 | 10.3 | 3.30 |
| 5 | 9.85 ± 0.02 | 3.25 |
| 6* | 3.02 ± 0.02 | 3.31 |
| 7* | 9.34 ± 0.24 | 3.31 |
| 8* | 9.43 ± 0.28 | 3.4 |
| 9 | 10.90 ± 0.16 | 3.46 |
| 10 | 9.28 ± 0.03 | 3.25 |
| 11 | 9.64 ± 0.23 | 3.4 |
| 12 | 9.98 ± 0.28 | 3.37 |
| 13 | 10.28 ± 0.18 | 3.48 |
| 14 | 9.78 ± 0.13 | 3.44 |
| 15 | 10.4 | 3.54 |
| 16 | 9.96 ± 0.09 | 3.45 |
| 17 | 9.45 ± 0.45 | 3.31 |
| 18 | 9.25 ± 0.21 | 3.36 |
| 19 | 11.0 ± 0.15 | 3.35 |

*Outside the scope of the present claims.

EXAMPLES 20-29

1. Preparation of Green Samples

A raw material powder of $Si_3N_4$ with alpha $Si_3N_4$ content greater than 85% and containing less than 100 PPM of metallic impurities such as Fe, Al, Ca, Na, or K and 1 wt % by weight of oxygen and having an average grain size of 0.6 micrometer and a specific surface area of 13 $m^2/g$ was mixed with an additive as shown in Table 3. The additive had an purity of more than 99% by weight and an average grain size less than 10 micrometers. Thereafter, 200 to 300 g of the raw material thus formulated were wet milled in a 1.2 liter plastic bottle using zirconia grinding media and isopropanol (500 ml) for at least 6 hrs. The slurry was vacuum dried overnight and the milled powder was sieved through a 30-mesh sieve. The sieved powder was isostatically pressed at a pressure of 206 MPa to obtain billets of approximate dimension 2 cm by 2 cm by 6 cm.

2. Firing Process

Billets prepared as specified above were placed in a graphite crucible. The crucible was loaded into a two-zone carbon furnace having a hot zone 15 cm in diameter by 22 cm in height. The furnace was then evacuated and pressurized to 50 PSi with pure nitrogen gas. After

TABLE 1

| Ex. | Powder | Composition of Sintering Add. (wt %) | Temp. (°C.) | Time (h) | $N_2$ (psi) | + | Temp. (°C.) | Time (h) | $N_2$ (psi) |
| --- | --- | --- | --- | --- | --- | --- | --- | --- | --- |
| 2 | $Si_3N_4$ | 6.75$La_2O_3$—2.25$Y_2O_3$—1$SiO_2$ | 1900 | 1.5 | 150 | + | 2000 | 2 | 1050 |
| 3 | $Si_3N_4$ | 6.75$La_2O_3$—2.25$Y_2O_3$—1$SiO_2$ | 1900 | 2 | 130 | + | 2050 | 3 | 1050 |
| 4 | $Si_3N_4$ | 5.4$La_2O_3$—1.8$Y_2O_3$—0.8$SiO_2$ | 1900 | 2 | 130 | + | 2050 | 3 | 1200 |
| 5 | $Si_3N_4$ | 4.5$La_2O_3$—4.5$Y_2O_3$—1$SiO_2$ | 2000 | 4 | 500 | + | 2075 | 3 | 1500 |
| 6* | $Si_3N_4$ | 4.05$La_2O_3$—1.35$Y_2O_3$—0.6$SiO_2$ | 2000 | 4 | 500 | + | 2075 | 3 | 1500 |
| 7* | $Si_3N_4$ | 4.5$La_2O_3$—4.5$Y_2O_3$—1$SiO_2$ | 2000 | 4 | 500 | | — | — | — |
| 8* | $Si_3N_4$ | 6.29$Er_2O_3$—3.71$Y_2O_3$ | 2000 | 4 | 500 | | — | — | — |
| 9 | $Si_3N_4$ | 6.5$Yb_2O_3$—6.5$DY_2O_3$ | 1950 | 4 | 200 | + | 2050 | 2 | 800 |
| 10 | $Si_3N_4$ | 5.98$Er_2O_3$—3.52$Y_2O_3$—0.5$SiO_2$ | 1950 | 2 | 200 | + | 2050 | 2 | 800 |
| 11 | $Si_3N_4$ | 6.29$Er_2O_3$—3.71$Y_2O_3$ | 1950 | 2 | 200 | + | 2050 | 2 | 800 |
| 12 | $Si_3N_4$ | 6.66$Pr_2O_3$—4.56$Y_2O_3$ | 1900 | 1.5 | 150 | + | 2000 | 2 | 30,000 |
| 13 | $Si_3N_4$ | 5.5$Yb_2O_3$—5.5$DY_2O_3$ | 1950 | 2 | 200 | + | 3050 | 2 | 1500 |
| 14 | $Si_3N_4$ | 7.33$Yb_2O_3$—3.67$DY_2O_3$ | 1950 | 2 | 200 | + | 2050 | 2 | 1500 |
| 15 | $Si_3N_4$ | 3.67$Dy_2O_3$—7.33$Yb_2O_3$ | 1950 | 3 | 200 | + | 2050 | 2 | 1500 |
| 16 | $Si_3N_4$ | 5$Yb_2O_3$—5$Dy_2O_3$ | 1950 | 2 | 250 | + | 2050 | 3 | 1500 |
| 17 | $Si_3N_4$ | 5.54$Er_2O_3$—3.26$Y_2O_3$ | 1950 | 3 | 200 | + | 2050 | 2 | 1500 |
| 18 | $Si_3N_4$ | 5.82$Er_2O_3$—3.43$Y_2O_3$—0.75$SiO_2$ | 1950 | 2 | 250 | + | 2050 | 3 | 1500 |
| 19 | $Si_3N_4$ | 8.8$La_2O_3$—4.2$Y_2O_3$—1.4$SiO_2$ | 1900 | 2 | 150 | + | 2050 | 3 | 1500 |

*Outside the scope of the present claims.

three gas release-pressurize cycles, the furnace was operated at the heating schedules shown in Table 3.

3. Characterization of Sintered Billets

The densities of the sintered bodies were measured by water immersion or geometrical methods. The fracture toughness values were measured using either short bar Chevron-Notched or 3-pt bend Chevron-Notched sample geometry. The results are shown in Table 4.

TABLE 3

| Ex. | Composition of Sintering Add. (wt %) | Temp. (°C.) | Time (h) | $N_2$ (psi) | + | Temp. (°C.) | Time (h) | $N_2$ (psi) |
|---|---|---|---|---|---|---|---|---|
| 20 | $6La_2O_3—2Y_2O_3—2SrO$ | 1960 | 4 | 250/2 h 900/2 h | + | 2050 | 2 | 1500 |
| 21 | $6La_2O_3—2Y_2O_3—2SrO$ | 1960 | 4 | 250/2 h 900/2 h | + | 2050 | 3 | 1500 |
| 22 | $6La_2O_3—2Y_2O_3—2SrO$ | 1960 | 4 | 450/2 h 900/2 h | + | 2050 | 4 | 1200 |
| 23 | $6La_2O_3—2Y_2O_3—2SrO$ | 1980 | 4 | 350 | + | 2050 | 3 | 900 |
| 24 | $6La_2O_3—2Y_2O_3—2SrO$ | 1950 | 4 | 250 | + | 2050 | 4 | 900 |
| 25 | $5.4La_2O_3—1.8Y_2O_3—0.8SrO$ | 1950 | 4 | 350/2 h 900/2 h | + | 2050 | 1 | 1050 |
| 26 | $5.4La_2O_3—1.8Y_2O_3—0.8SrO$ | 1960 | 4 | 350 | + | 2050 | 2 | 1200 |
| 27 | $5Yb_2O_3—5Dy_2O_3—2SrO_2$ | 1950 | 4 | 250/1.5 h 1500/2.5 h | + | 2050 | 4 | 1200 |
| 28 | $5Er_2O_3—3Y_2O_3—2SrO$ | 1950 | 4 | 250 | + | 2050 | 3 | 900 |
| 29 | $6.75La_2O_3—2.25Y_2O_3—1SrO_2$ | 1900 | 4 | 150 | + | 2000 | 4 | 450 |

TABLE 4

| Example No. | Fracture Toughness (MPa · m$^{\frac{1}{2}}$) | Density (g/cm$^3$) |
|---|---|---|
| 20 | 9.1 | 3.32 |
| 21 | 9.4 | 3.32 |
| 22 | 9.5 | 3.32 |
| 23 | 9.6 | 3.32 |
| 24 | 11.6 | 3.32 |
| 25 | 9.5 | 3.29 |
| 26 | 10.0 | 3.31 |
| 27 | 11.4 | 3.45 |
| 28 | 9.1 | 3.32 |
| 29 | 10.1 | 3.31 |

COMPARATIVE EXAMPLE C11

A $Si_3N_4$ ceramic which was processed according to the procedures detailed in Comparative Example C1, i.e., processed in a conventional way, was found to have a fracture toughness of about 5.3 MPa·m$^{\frac{1}{2}}$. The thermal diffusivity of this material was measured by the Laser flash method and found to be 0.117 cm$^2$.s$^{-1}$ at 23° C. The specific heat and density of this billet were 0.6532 J.g$^{-1}$.K$^{-1}$ and 3.25 g.cm$^{-3}$ at ambient temperature, respectively. From these data the thermal conductivity of this silicon nitride at ambient temperature is calculated to be 24.8 W.m$^{-1}$.K$^{-1}$. This value of thermal conductivity is in the range of values (about 25 to about 40 W.m$^{-1}$.K$^{-1}$) which are reported in the patent and journal literature for silicon nitride.

EXAMPLE 30

Silicon nitride with 6.75 w % $La_2O_3$, 2.25 w % $Y_2O_3$, 1.0 w % $SiO_2$ sintered, as described in Example 3, was found to have a fracture toughness of about 11 MPa·m$^{0.5}$. The thermal diffusivity of this material was measured by the Laser flash method and found to be 0.3320 cm$^2$.s$^{-1}$ at 23° C. The specific heat and density of this billet were 0.6331 J.g$^{-1}$.K$^{-1}$ and 3.3 g.cm$^{-3}$ at ambient temperature, respectively. From these data the thermal conductivity of this silicon nitride at ambient temperature is calculated to be 67.3 W.m$^{-1}$.K$^{-1}$. This value of thermal conductivity is much higher than the values of thermal conductivity for silicon nitride which are reported in the patent and journal literature and which range from about 25 to about 40 W.m$^{-1}$.K$^{-1}$.

EXAMPLE 31

Silicon nitride with 6 w % $La_2O_3$, 2 w % $Y_2O_3$, 2 w % SrO was sintered at 1950° C. for 4 hrs. under 250 psi of nitrogen followed by sintering at 2050° C. for 4 hrs. under 1500 psi of nitrogen and found to have a fracture toughness of about 12.3 MPa·m$^{0.5}$. The thermal diffusivity of this material was measured by the Laser flash method and found to be 0.382 cm$^2$.s$^{-1}$ at 23° C. The specific heat and density of this billet were 0.6306 J.g$^{-1}$.K$^{-1}$ and 3.33 g.cm$^{-3}$ at ambient temperature, respectively. From these data the thermal conductivity of this silicon nitride at ambient temperature is calculated to be 80.2 W.m$^{-1}$.K$^{-1}$. This value of thermal conductivity is much higher than the values of thermal conductivity for silicon nitride which are reported in the patent and journal literature and which range from about 25 to about 40 W.m$^{-1}$.K$^{-1}$.

6. Discussion

The fracture toughness of Comparative Example C1, which reflects conventional processing of silicon nitride, is only 6 MPa·m$^{\frac{1}{2}}$. The fracture toughness of silicon nitrides prepared according to Comparative Examples C2–C9, Tables C1 and C2, which are outside the scope of the present invention but reflect formulation and processing for the preparation of higher toughness ceramics, is in the range of 7.75 to 9.0 MPa·m$^{\frac{1}{2}}$. The fracture toughness values for these examples are shown on the left hand side of FIG. 11. The fracture toughness of silicon nitrides which reflect the scope of the present invention are given by Examples 1, 2–5 and 9–19 in Tables 1 and 2, and Examples 20–29 in Tables 3 and 4. These fracture toughness values range from 9.1 to 11.6 MPam$^{\frac{1}{2}}$ and are plotted on the right hand side of FIG. 11.

Figure 11:
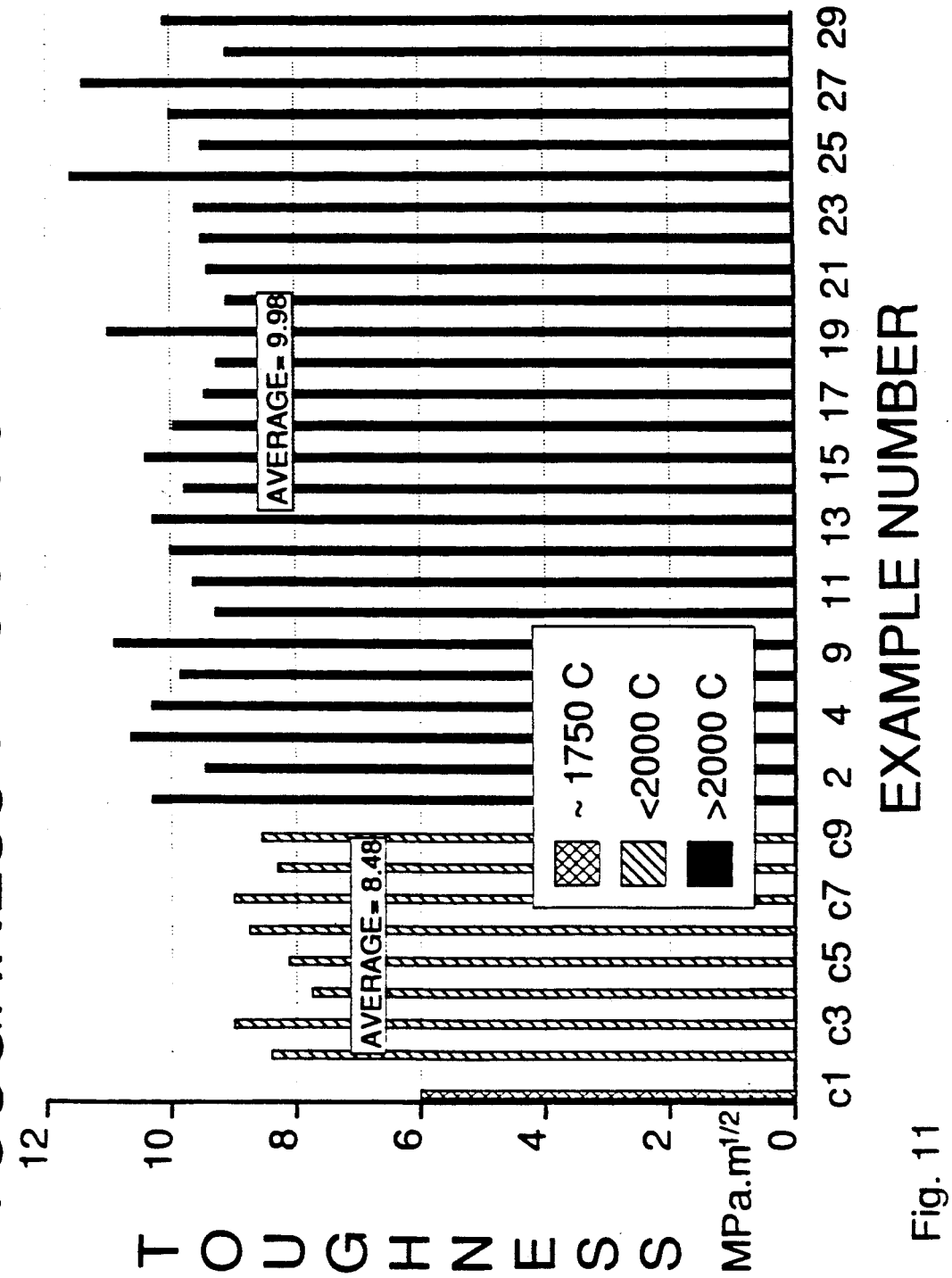
FIG. 11 is a graph of fracture toughness values (from the Examples of this application).

The fracture toughness of silicon nitride depends, to a certain degree, on the composition and volume fraction of the grain boundary phase and, to a greater degree, on the grain size, grain size distribution, and aspect ratio of $Si_3N_4$ grains. However, both the grain boundary phase and $Si_3N_4$ grain size and aspect ratio characteristics depend on the sintering aids used in the formulation of the material. In addition, we have discovered that the $Si_3N_4$ grain size and aspect ratio characteristics and, therefore, fracture toughness are strongly affected by the temperature and time conditions in the densification and heat treatment steps. These effects are shown in the cited examples and the graphical data of FIG. 11. Conventional processing of silicon nitride at temperatures of about 1750° C. leads to ceramics with low fracture toughness, i.e., about 6 MPa·m$^{\frac{1}{2}}$. Processing at temperatures below 2000° C., as depicted in Comparative Examples C2–C9 of the present application and by the examples cited by Tani et al., *Am. Cer. Soc. Bull*, 65, pp. 1311–1315 (1986) lead to ceramics with fracture toughness less than 9.0 MPa·m$^{\frac{1}{2}}$. However, the average fracture toughness of the Si$_3$N$_4$ prepared according to Comparative Examples C2-C-9, FIG. 11, is 8.48 MPa·m$^{\frac{1}{2}}$ which is higher than the average fracture toughness of 7.9 MPa·m$^{\frac{1}{2}}$ of Tani et al. The higher fracture toughness of the present Comparative Examples may reflect the combined beneficial effects of sintering aids and processing conditions which have led to the discoveries of the present invention. One of these discoveries is the preparation of monolithic silicon nitride ceramics with fracture toughness greater than 9.0 MPa·m$^{\frac{1}{2}}$ as depicted by the data of Examples 1, 2–5, and 9–29 which are shown on the right hand side of FIG. 11. The average fracture toughness of the ceramics of these examples is 9.98 MPa·m$^{\frac{1}{2}}$ which is, statistically, significantly different and higher than the fracture toughness of ceramics given by comparative examples C2–C9 and much higher than the fracture toughness of silicon nitride ceramics published in the journal and patent literature [cf. Tani et al.]. The higher fracture toughness of these monolithic silicon nitride ceramics is due to the combined beneficial effects of sintering aid mixtures and processing conditions which comprise at least one densification step at temperatures below 2000° C. for a time period between 1 to 10 hrs. and at least one heat treatment step at temperatures in excess of 2000° C. for a time period of 1 to 10 hrs. These sintering aid mixtures and processing conditions lead to monolithic silicon nitride ceramics of unique microstructure, as exemplified by FIGS. 3(a) and 3(b), which confers to the ceramic its unusually high fracture toughness.

Another discovery of the present invention, is the property of rising crack growth resistance with crack extension, i.e., R-curve behavior, that high toughness silicon nitride exhibits. Other such discoveries include but not limited to improved damage tolerance, high Weibull modulus, and high thermal conductivity. These properties are discussed below.

We first turn to R-curve behavior. The indentation/strength behavior of silicon nitride of Comparative Example C1 yields a value of −0.3013 for the constant B in Test 2 which implies that this ceramic does not exhibit R-curve behavior or damage tolerance (cf. theory predicts that ceramics for which the constant B is equal to −$\frac{1}{3}$ do not have R-curve behavior and the value of −0.3013 is not significantly different from −$\frac{1}{3}$ at 98% confidence level). The absence of R-curve behavior in this silicon nitride is in agreement with the earlier findings of Salem and Shannon (1987) on conventionally processed silicon nitrides.

In sharp contrast to conventionally processed silicon nitride as exemplified by Comparative Example C1, silicon nitride formulated and processed according to the present invention and as described in Examples 1, 2–5, 9–29 and 30–31 exhibit, unexpectedly, R-curve behavior. For instance, the silicon nitride of Example 3 which is characterized by a highly acicular microstructure and a high density of large grains shows a sharp increase in crack growth resistance as the crack extends, in other words it exhibits R-curve behavior. This behavior is a result of the unique microstructure of this ceramic which makes the path of a propagating crack very tortuous (crack deflection processes) and leads to grain bridging processes in the wake of the crack. The R-curve behavior of the silicon nitride of the present invention is a highly unexpected result.

The R-curve behavior of the ceramics of the present invention is also confirmed by their indentation/strength behavior. For instance, the value of the constant B in Test 2 for the ceramic of Example 3 is −0.227 which is much higher than −$\frac{1}{3}$ and, therefore, the ceramic of the present invention has strong R-curve behavior. The implication of the higher value for the constant B for this ceramic is that the rate of strength reduction as indentation load (i.e., damage) increases is less than the corresponding rate for a material without R-curve behavior. In other words, the ceramic of Example 3 which has R-curve behavior retains a higher fraction of its initial strength than a ceramic without R-curve behavior when damaged under the same indentation load. For example, the material of Example 3, after being indented with a Vickers indenter at a load of 196N, retains 60% of its initial strength while a ceramic without R-curve behavior retains only 25% of its initial strength. These data show that the monolithic silicon nitride ceramic of the present invention which has R-curve behavior also has a better tolerance to damage than a comparable ceramic without R-curve behavior.

Moreover, the monolithic silicon nitride of the present invention has a higher Weibull modulus as a result of its unique microstructure. The Weibull modulus is a measure of the distribution of strength of a ceramic which, in turn, reflects the distribution of critical flaw sizes in the material. The critical flaw size distribution is affected by the powder used to make the ceramic, the special treatments to which the powder is subjected, the method used to form a powder compact, the method used to densify the powder compact, the special treatments to which the sintered ceramic is subjected, the machining flaws inflicted on the ceramic during test specimen preparation, and the microstructure of the ceramic. For these reasons, comparisons of Weibull modulus for ceramics which have been processed by methods which are different in more than one of the aforementioned effects should not be made.

This comparison can be made for the ceramics prepared in Comparative Example C1 and Example 3 because in both cases untreated powders are mixed and compacted by the same procedures, and the sintered ceramics were not subjected to any additional treatments and were machined into test specimens by the same techniques. The Weibull modulus of monolithic silicon nitride prepared according to the procedure of Comparative Example C1 is in the range of 7–10. These values are typical for the Weibull modulus of silicon nitride ceramics which have been prepared from powder compacts formed by cold isostatic pressing (the method used in the cited Examples) and which ceramics have a microstructure made up of very fine grains and no R-curve behavior. On the other hand, the corresponding modulus of the silicon nitride of Example 3 which has a microstructure of highly acicular grains and a high density of large grains and which has pronounced R-curve behavior is 18.2. This high value of Weibull modulus for the silicon nitride ceramics of the present invention reflects the unique microstructure and the R-curve behavior of the material.

In addition, the silicon nitride of the present invention has unexpectedly and unusually high thermal conductivity. The thermal conductivity of the ceramic cited in Comparative Example C11, which is processed by conventional methods, is only 24.8 W.m$^{-1}$.K$^{-1}$, which is in the range of thermal conductivity values of similar ceramics in the prior art. By way of contrast, the thermal conductivity of the ceramics of the present invention as cited in Examples 30 and 31 is 67.3 and 80.2 W.m$^{-1}$.K$^{-1}$, respectively. These values are much higher than the best thermal conductivity reported in the prior art. Notably, the thermal conductivity of the ceramic in Example 31 is two times the best thermal conductivity value reported by Ziegler and Hasselman (1981). The high conductivity of the silicon nitride ceramics of the present invention improves the thermal shock resistance of this ceramic and reduces the thermal stresses that are generated in thermally transient environments. Without being bound by any particular theory, it is believed that the high thermal conductivity of the ceramic is attributable to its unique microstructure (i.e., the high density of large, high crystallinity and high purity grains) and the moderate amounts of sintering aids utilized.

In formulating the ceramic there is required an appropriate quantity of sintering aids in order to obtain not only full densification but also the unique microstructure which leads to high fracture toughness, R-curve behavior, damage tolerance, high Weibull modulus and high thermal conductivity as discussed previously. It has unexpectedly been found that when the sintering aid used in about 6 w % or less, the resulting ceramic has low fracture toughness even through the microstructure is highly acicular. This finding is illustrated by the ceramic which was prepared according to Example 6. When sintered to full density in the presence 6 w % sintering aids, the ceramic exhibited a fracture toughness of only 3.02 MPa·m$^{0.5}$. In contrast to these findings, when the amount of sintering aids was increased to 8 w % or higher the fracture toughness of the resultant ceramics was found to be in the range of 9.28 to 11.0 MPa·m$^{0.5}$. These data show that the amount of sintering aid used must be greater than about 6 w % in order to obtain silicon nitride ceramics with high fracture toughness and other desirable properties as discussed above. On the other hand, if the amount of sintering aids is higher than about 18 w % the resultant ceramic will not have good mechanical properties, such as Young's modulus, flexural and tensile strength or creep resistance at high temperature because of the large amount of oxide or oxynitride grain boundary phase which will be present in the sintered ceramic.

Test 1. R-Curve Behavior

The crack growth resistance of the silicon nitride ceramic of the present invention, as a function of crack extension, was measured using the double cantilever beam (DCB) technique discussed by A. Reichl and R. W. Steinbrech in *J. Am. Ceram. Soc.*, Vol. 71, C-299-C-301 (1988). If the resistance to crack growth, i.e. toughness, increases with crack extension, the material is said to exhibit R-curve behavior.

Figure 10:
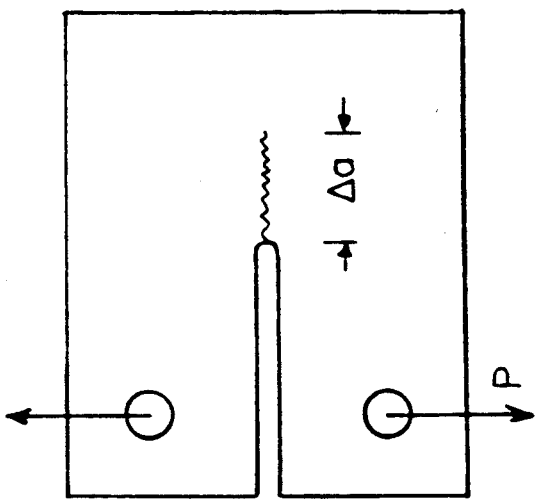
FIG. 10 is a schematic of the double cantilever beam specimen used in measuring R-curve behavior

A silicon nitride cylindrical billet prepared according to Example 3 was cut into rectangular plates and diamond ground to approximately 3 mm thickness. "Short" DCB specimens, of the type shown in FIG. 10, were made from these plates with final dimensions of approximately 30 by 25 by 3 mm. One 30 by 25 mm surface was diamond polished to 1 micrometer finish. A 23 mm notch was cut with an 800 micrometer diamond saw, and an additional 2 mm notch was cut with an approximately 180 micrometer diamond saw to act as a starter crack.

The toughness of the silicon nitride as a function of crack extension was measured from stable crack growth experiments in air. The crack length, load, and displacement were measured simultaneously using a dedicated testing machine equipped with a traveling microscope at Case Western Reserve University, Cleveland, Ohio. The toughness curve was calculated from the experimental compliance data using the equation:

$$G = \frac{P^2}{2t} \frac{dc}{da}$$

where G is strain energy release rate, P is load, t is the DCB specimen thickness, and dc/da is the rate of change of compliance, c, with crack extension, a, and $$K_r = \left[ \frac{EG}{1 - n^2} \right]^{\frac{1}{2}}$$

where E and n are the Young's modulus and Poisson's ratio, respectively, and $K_r$ is fracture toughness as discussed by M. J. Readey et al. in *Mat. Res. Soc. Smp. Proc.*, Vol. 78, 107-120 (1987).

The toughness curve for the silicon nitride of the present invention is shown in FIG. 4. This curve shows that the toughness of the ceramic increased with increasing crack length and, therefore, this silicon nitride exhibits R-curve behavior. The data in FIG. 4 shows that the fracture toughness of the material increases from about 4.7 to about 10.0 MPa m$^{0.5}$ over a crack extension of about 1.5 mm, and remains approximately constant on further crack increase.

Figure 5A:
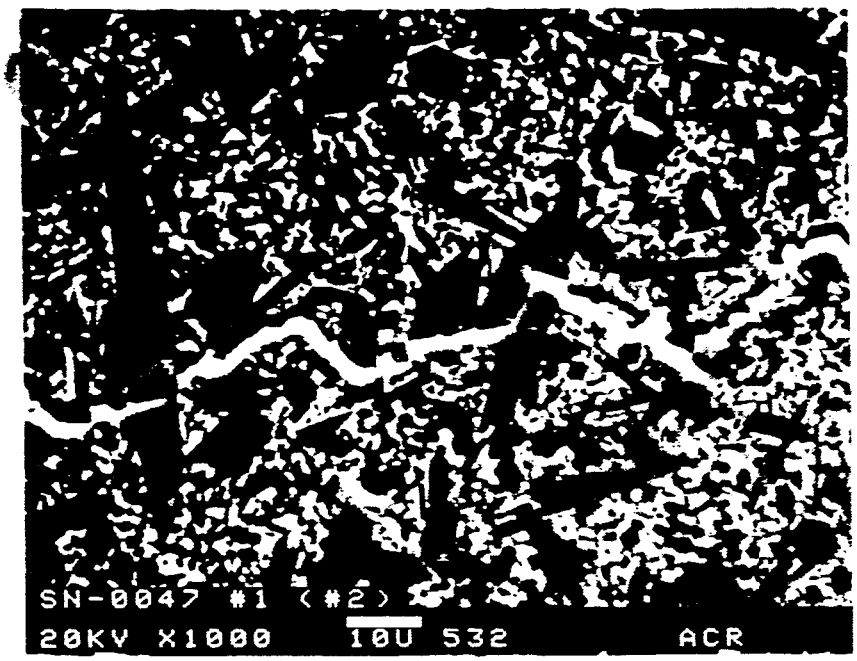
FIG. 5(a) and 5(b) are scanning electron micrographs of the billet of FIG. 4 showing a tortuous crack path.
Figure 5B:

FIGS. 5(a) and 5(b) show short lengths of the crack which was grown stably in the DCB specimen. FIG. 5(a) shows typical morphology of the crack that was propagated for about 2.5 mm. The crack follows a tortuous path with frequent and sharp deflections. These deflections are partly responsible for the high toughness of this silicon nitride, in analogy with the crack-deflection toughening discussed by K. T. Faber and A. G. Evans in *J. Am. Ceram. Soc.*, vol. 66, C-94-C-96 (1983).

FIG. 5(b) shows a large silicon nitride grain which fractured, at almost 90° angle to its prismatic axis, as the crack propagated past the grain location. In addition, the grain has been pulled a short distance out of its socket within the bulk of the ceramic as the crack propagated further. This figure demonstrates that phenomena known in the art as crack bridging and needle-like grain pull-out processes are active in this high toughness silicon nitride. These phenomena are primarily responsible for the R-curve behavior which is exhibited by this ceramic. Surprisingly, this R-curve behavior is observed in silicon nitride ceramics that are densified and heat treated in accordance with the present invention.

Test 2. Indentation/Strength Behavior

Indentation/strength measurements are relatively fast and simple experiments which provide information on whether a material possesses R-curve properties, as discussed by R. F. Krause, Jr. in *J. Am. Ceram. Soc.*, 71, pp. 338-43 (1988). Furthermore, data produced by these measurements, when plotted as strength vs. indentation load, illustrate the damage tolerance property of the material.

The indentation/strength measurement is carried out by cutting the material to be tested into 3 mm by 4 mm by 50.8 mm bars. Indentations were made in the central region of the bar with a Vickers diamond indenter. The fracture strength, S, of the indented bar was then measured under 4-pt bend loading with the indented surface on the tensile side. A series of indentation loads, P, ranging from 9.8N to 294N were applied, and each bar was indented with a specific indentation load. Care was taken that each bar broke with fracture cracks initiating from the indented site. Typically, 4 or 5 indentations, 0.5 mm apart, were applied on those bars indented with load equal to or less than 49N to increase the probability that fast fracture initiated from an indented site. To obtain accurate information on the shape and magnitude of the R-curve of the material tested, the surface of the bar was diamond polished to 1 micrometer finish prior to indentation to remove residual stresses induced from machining.

Fracture mechanics analysis, as discussed by P. Chantikul et al., in *J. Am. Ceram. Soc.*, 64, pp. 539-543 (1981), predicts that a log-log plot of indentation strength S vs. indentation load P should result in a straight line according to the equation $$\log S = \log A + B \log P$$

and that the slope, B, of this line, i.e.:

$$B = \frac{d(\log S)}{d(\log P)}$$

should be equal to $-\frac{1}{3}$ if the material does not have R-curve behavior. This model has been verified and is broadly applied to measure the fracture toughness of ceramics. Moreover, several monolithic silicon nitride ceramics have been shown to have B equal to $-\frac{1}{3}$ (see, for example, P. Chantikul et al., *J. Am. Ceram. Soc.*, 64, 539-43 (1981) and Y. Tajima et al., Powder Processing Science, Orlando, Fla., Nov. 1-4, (1987), indicating that those silicon nitride materials do not have R-curve behavior.

Fracture mechanics also predicts [Krause (1988)] that if a material has R-curve behavior, then B would be larger than $-\frac{1}{3}$.

Figure 6:
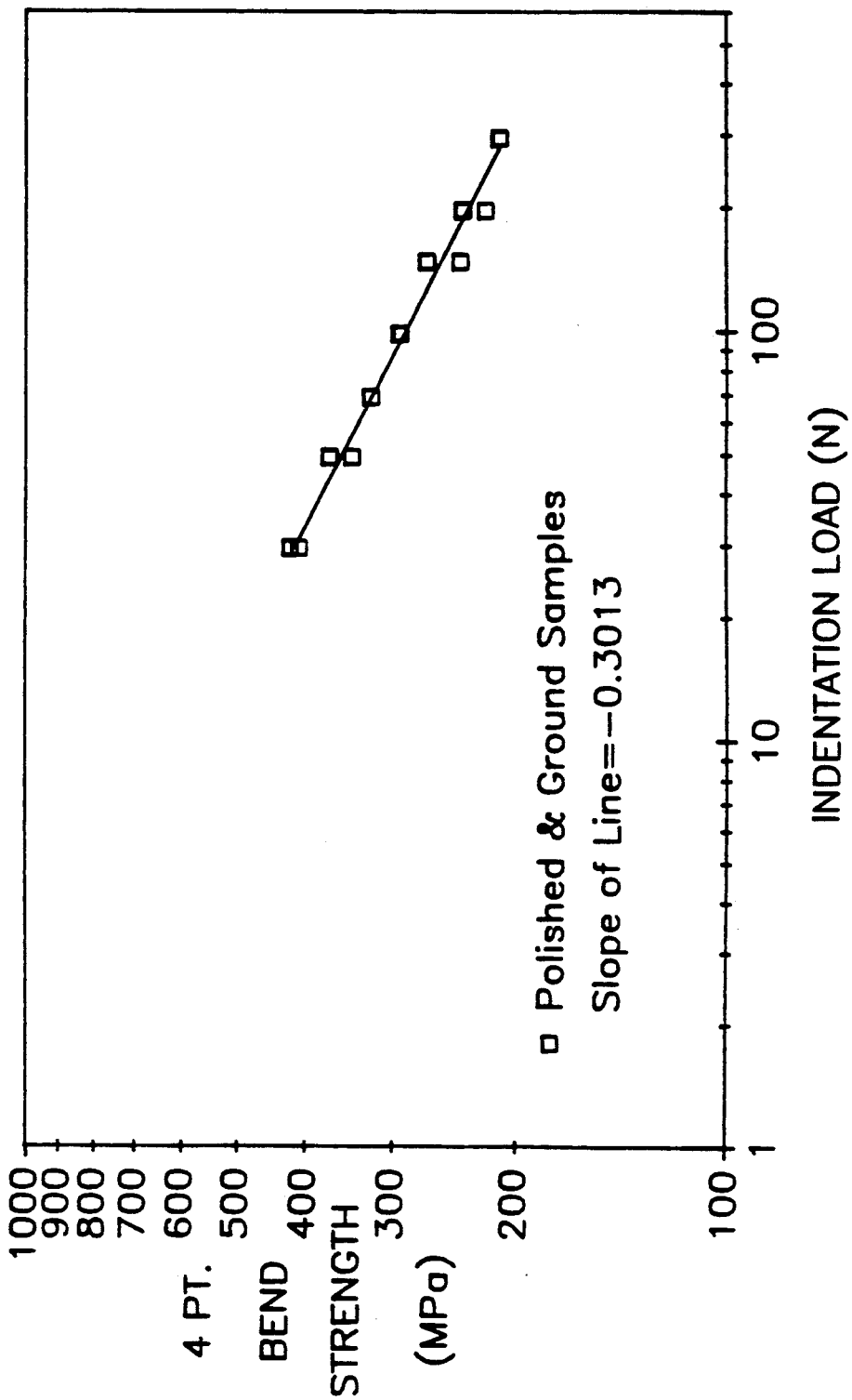
FIG. 6 is a plot of indentation bend strength measured as a function of indentation load for the ceramic of FIG. 1(a)

Indentation/strength data for the material of Comparative Example 1 are plotted in FIG. 6. Least squares analysis of these data show that the slope, B, is equal to $-0.3013$, which is not significantly different, at 98% confidence level, from the theoretical value of $-\frac{1}{3}$ predicted for a material which does not have R-curve behavior. As discussed in Comparative Example C1, the fracture toughness of this material is relatively low at 6.0 MPa·m$^{\frac{1}{2}}$. The microstructure of this material, as shown in FIG. 1a, consists of very fine grains which do not cause crack bridging and grain pull-out phenomena to occur. Therefore, the material does not have R-curve behavior as demonstrated by the indentation strength data.

Figure 7:
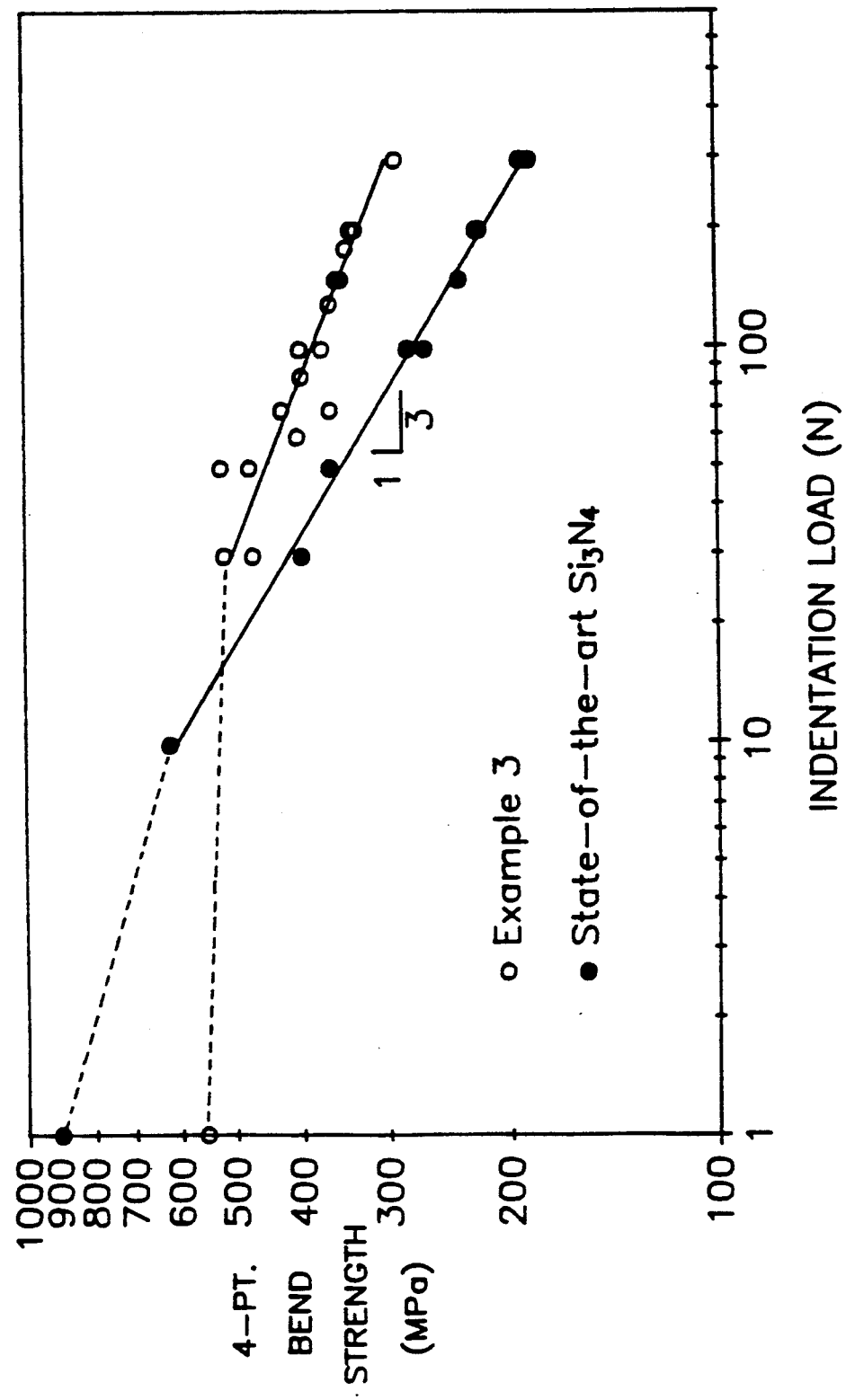
FIG. 7 is a graph depicting indentation bend strength as a function of indentation load for a commercial silicon nitride based ceramic and the ceramic of FIG. 3(a)

FIG. 7 compares the indentation/strength properties of samples manufactured in Example 3 with a state-of-the-art commercial monolithic silicon nitride made in Japan. The graph shows that: (1) Example 3 material has B=$-0.227$, which is significantly larger than $-\frac{1}{3}$, indicating strong R-curve behavior; and (2) the commercial material has B=$-\frac{1}{3}$ indicating that this silicon nitride does not have R-curve behavior. Thus, the indentation/strength results have confirmed the DCB results which show that the material of Example 3 has strong R-curve behavior.

Comparing the micrograph of the fracture surface of the material manufactured in Example 3 [see FIG. 3(b)] to the micrograph in FIG. 1(a) which is the micrograph of the fracture surface of the material manufactured in Comparative Example C1 (which does not have R-curve behavior), it is clear that the fracture path of the former is more tortuous. This more tortuous path is a result of the significant difference in microstructure. The material of Example 3 was especially processed so that a microstructure of wide grain size distribution results, with individual grains having sizes ranging from 0.5 µm to 50 µm in width and 5 µm to 500 µm in length. These grains are formed and distributed in such a way that significant toughening results and the fracture toughness (10.6 MPa·m$^{\frac{1}{2}}$) becomes about 2 times that of the material of Comparative Example 1. In addition, those large needle-like grains function like whiskers at the wake of the propagating crack so that a bridging and/or grain pull-out type of mechanism exists [see FIG. 5(a) and (b)]. The presence of these mechanisms causes the material to possess strong R-curve behavior as demonstrated in Test 1 and Test 2.

Figure 8:
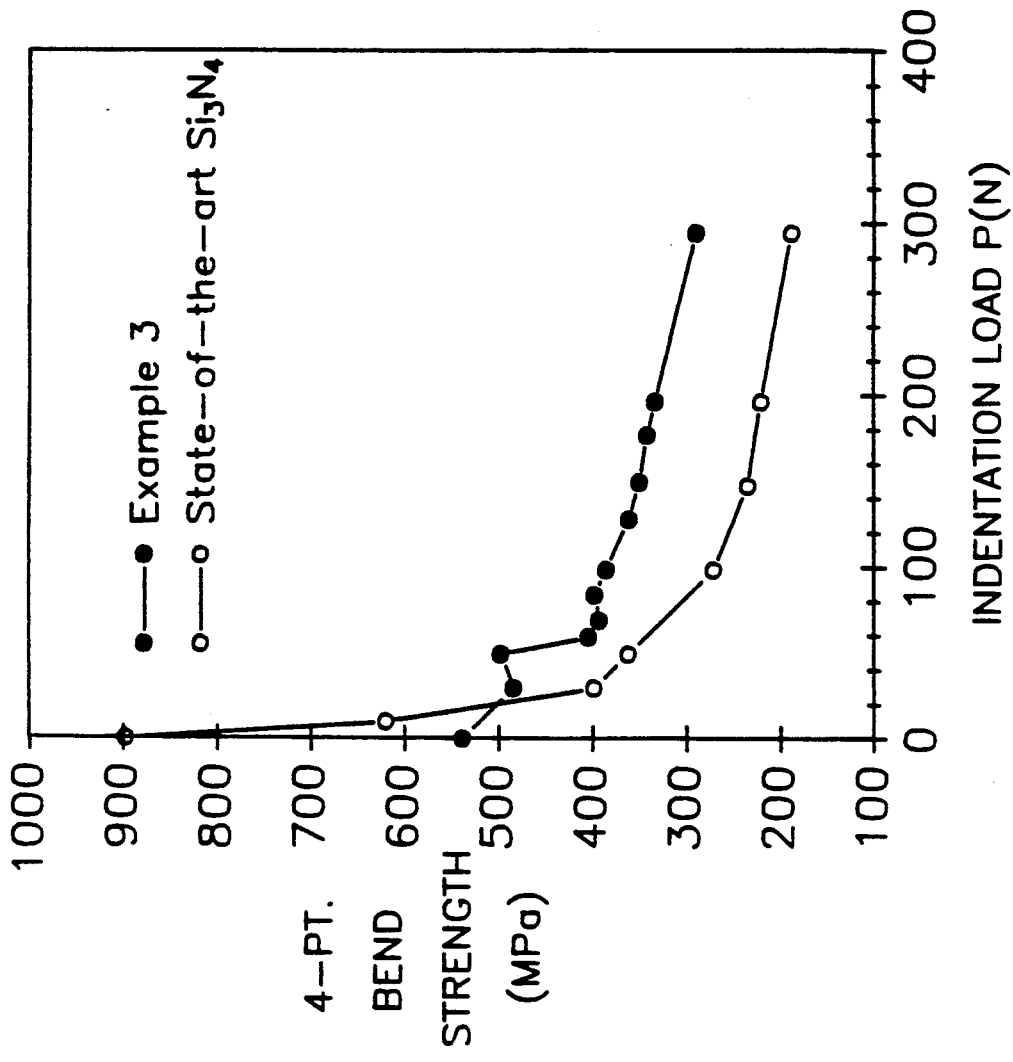
FIG. 8 is a graph depicting on linear scale the data presented in FIG. 7.

In FIG. 7, it is shown that the rate of strength reduction as indentation load (i.e. damage) increases for the ceramics manufactured in Example 3 is less than for the state-of-the-art commercial monolithic Si$_3$N$_4$ ceramic. That is, the ceramic manufactured in Example 3 which has strong R-curve behavior has the desirable damage tolerance property. This property can be more easily appreciated by examining FIG. 8, which depicts the data of FIG. 7 on a linear scale. Initially, the commercial Si$_3$N$_4$ ceramic has a strength of about 900 MPa, which is about 40% stronger than the material manufactured in Example 3. However, after only a 29.4N indentation (i.e. damage), the material manufactured in accordance with the present invention becomes the stronger one. After a 196N indentation, the commercial Si$_3$N$_4$ ceramic has lost 75% of its initial strength, while material of the present invention still retains 60% of its initial strength, and is about 40% stronger than the commercial material. It is generally accepted that Vickers indentation-induced damage closely simulates the impact damage on ceramics during service. In addition, the material with R-curve behavior has higher resistance not only to impact damage but also to other forms of damage such as physical, chemical and thermal damage. That is to say, the material of the present invention having high toughness and R-curve behavior will retain a higher fraction of its strength upon damage, and is therefore referred to as damage tolerant material.

Test 3. Weibull Modulus

Another desirable property of material having R-curve behavior is a narrow distribution of strength [K Kendall et al., *J. Mater. Res.*, Vol. 1, pp. 120-123 (1986); R. F. Cooke and D. R. Clarke, *Acta. Metall.*, Vol. 36, pp. 555-562 (1988)]. The distribution of he strength constitutes a Weibull's probability distribution function of rupture, which is expressed by the following equation:

$$F(\sigma) = 1 - \exp(-(\sigma/\sigma_o)^m)$$

in which

F($\sigma$): probability distribution function of rupture at strength value $\sigma$;

$\sigma_o$: constant; and m: Weibull's constant.

The greater the m, a variable in Weibull's probability distribution function of rupture, the smaller the strength distribution. The smaller the m, the greater the strength distribution. Kendall et al. and Cooke et al.'s model shows that m can be more than doubled for material with strong R-curve behavior.

Figure 9:
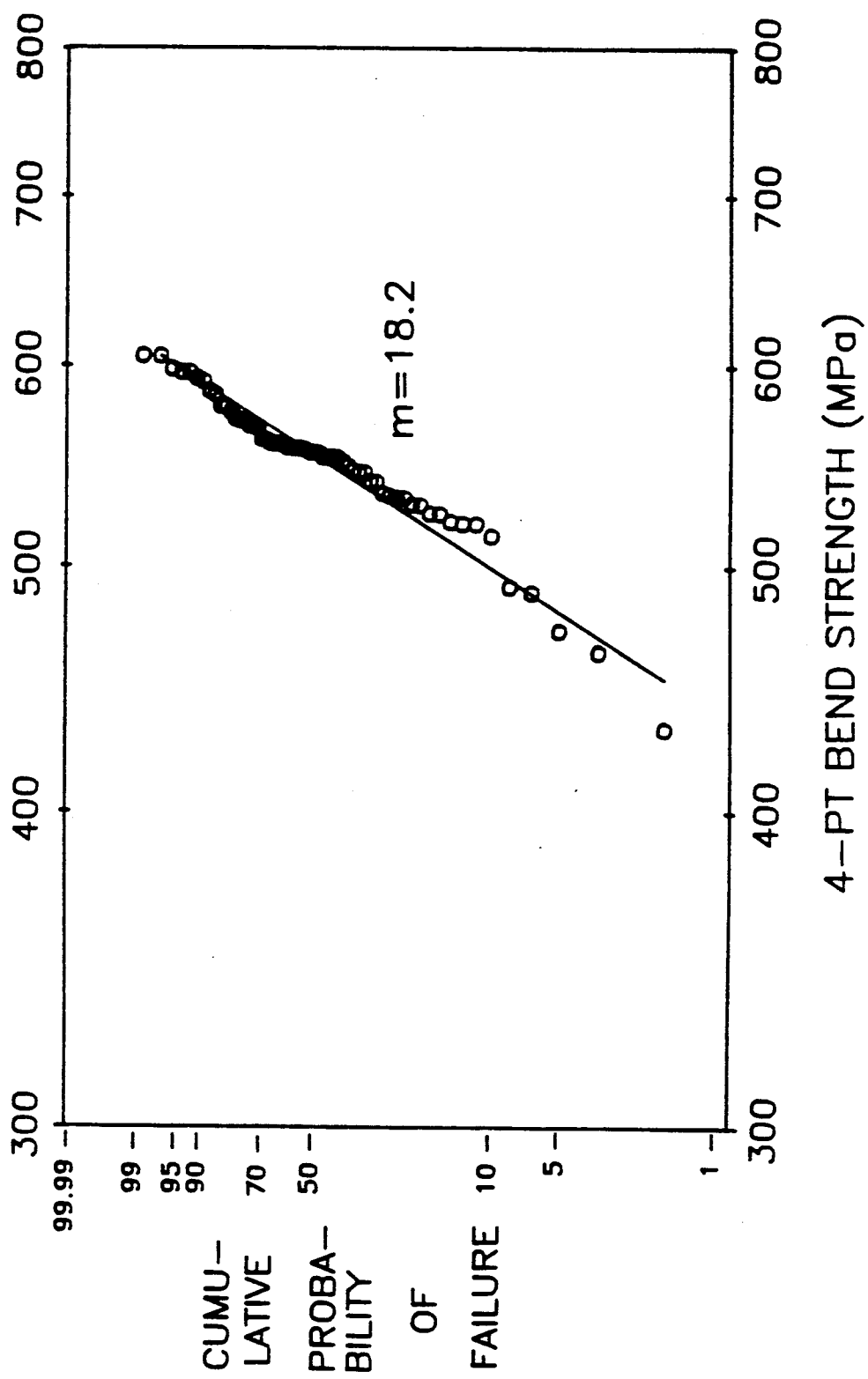
FIG. 9 is a plot of cumulative probability of failure measured as function of 4-point bend strength for the ceramic of FIG. 3(a)

FIG. 9 shows the m value for the ceramics manufactured in Example 3 is 18.2. This value is high as compared to values reported in the literature, where typically m is close to 10 for ceramic materials processes in the conventional way. The very high Weibull modulus of our isopressed material is a direct result of the R-curve property the material possesses.

What is claimed:

1. A monolithic silicon nitride ceramic, said ceramic having been densified and heat treated in the presence of about 6.5 to 18 wt % refractory sintering aids, the balance of said ceramic being silicon nitride and incidental impurities, said densification and heat treatment having been carried out in at least two steps, wherein:
   (a) at least a first of said steps is carried out at a temperature between 1750° C. and 2000° C. and for a time ranging from about 1 to 10 hrs. in order to prepare an intermediate ceramic with a density of at least 90% of theoretical;
   (b) at least a succeeding one of said steps is carried out at a temperature higher than 2000° C. for a time ranging from about 1 to 10 hrs. in order to heat treat the intermediate ceramic; and
   (c) each of said steps is carried out under nitrogen pressure sufficiently high to avoid decomposition of silicon nitride to thereby provide a ceramic having a density greater than 95% of theoretical density, a Chevron Notch fracture toughness of at least 9.0 MPa·m$^{\frac{1}{2}}$ at room temperature, and R-curve behavior.

2. A ceramic as recited by claim 1, having a 4-point bend strength Weibull modulus of at least 15.

3. A ceramic as recited in claim 1, having a damage tolerance characterized by the equation B=d (log S)/d(log P) where S is the 4 point bend strength measured after indentation, P is the Vickers indentation load and B is greater than −0.3.

4. A ceramic as recited by claim 1, having a thermal conductivity of at least 45 W.m$^{-1}$.K$^{-1}$ at ambient temperature.

5. A ceramic as recited in claim 1, said ceramic having been densified and heat treated in the presence of a refractory sintering aid, the major component of which is an oxide, nitride, or oxnitride compound of two or more of the elements Y, La, Ce, Pr, Nd, Sm, Sd, Tb, Dy, Ho, Er and Yb and the minor component of which is an oxide or oxynitride compound of one or more of the elements Mg, Sr, Ba, Al or Si.

6. A ceramic as recited in claim 5, wherein said sintering aid is present in an amount of at least 8.0 w %.

7. A ceramic as recited by claim 5, wherein said major component is present in an amount ranging from 5 to 14 w % and said minor component is present in an amount ranging from 0 to less than 4 w %.

8. A monolithic silicon nitride ceramic as recited by claim 1, having a Chevron Notch fracture toughness ranging from about 10 to 18 MPa·m$^{\frac{1}{2}}$.

9. A monolithic silicon nitride ceramic, said ceramic having been densified and heat treated in the presence of about 6.5 to 18 wt % refractory sintering aid having as a major component 5 to 14 w % oxide, nitride or oxynitride compound of at least two of the elements Y, La, Ce, Pr, Nd, Sm, Gd, Tb, Dy, Ho, Er and Yb and as a minor component 0 to less than 4 w % of an oxide or oxynitride compound of at least one of the elements Mg, Sr, Ba, Al and Si, the balance of said ceramic being silicon nitride and incidental impurities, said densification and heat treatment having been carried out in at least two steps, wherein:
   (a) at least a first of said steps is carried out at a temperature between 1750° C. and 2000° C. and for a time ranging from about 1 to 10 hrs. in order to prepare an intermediate ceramic with a density of at least 90% of theoretical;
   (b) at least a succeeding one of said steps is carried out at a temperature higher than 2000° C. for a time ranging from about 1 to 10 hrs. in order to heat treat the intermediate ceramic; and
   (c) each of said steps is carried out under nitrogen pressure sufficiently high to avoid decomposition of silicon nitride to thereby provide a ceramic having a density greater than 95% of theoretical density, a Chevron Notch fracture toughness of at least 9.0 MPa·m$^{\frac{1}{2}}$ at room temperature, and R-curve behavior.

* * * * *

UNITED STATES PATENT AND TRADEMARK OFFICE
CERTIFICATE OF CORRECTION

PATENT NO. : 5,100,847

DATED : Mar. 31, 1992

INVENTOR(S) : Chien-Wei Li, Jean Yamanis, Gilbert Carrasquillo

It is certified that error appears in the above-identified patent and that said Letters Patent is hereby corrected as shown below:

Column 19, line 41, "9.0 Mpa·m$^{\frac{1}{2}}$" should read --9.0 MPa.m$^{\frac{1}{2}}$--.

Column 20, line 7, "oxnitride" should read "--oxynitride--."

Column 20, line 8, "Sd" should read --Gd--.

Column 20, line 20, "18 Mpa·m$^{\frac{1}{2}}$" should read --18 Mpa.m$^{\frac{1}{2}}$--.

Column 20, line 47, "9.0 Mpa·m$^{\frac{1}{2}}$" should read --9.0 Mpa.m$^{\frac{1}{2}}$--.

Signed and Sealed this

Twenty-eighth Day of November 1995

Attest:

BRUCE LEHMAN

Attesting Officer

Commissioner of Patents and Trademarks